United States Patent
Nielsen et al.

(10) Patent No.: US 11,278,888 B2
(45) Date of Patent: Mar. 22, 2022

(54) MICROFLUIDIC CHANNELS TO CONVEY CELLS OF DIFFERENT SIZES

(71) Applicant: HEWLETT-PACKARD DEVELOPMENT COMPANY, L.P., Spring, TX (US)

(72) Inventors: Jeffrey A. Nielsen, Corvallis, OR (US); Debora J. Thomas, Corvallis, OR (US); Kathryn Cyr, Westbrook, CT (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/607,769

(22) PCT Filed: Apr. 3, 2018

(86) PCT No.: PCT/US2018/025839
§ 371 (c)(1),
(2) Date: Oct. 24, 2019

(87) PCT Pub. No.: WO2019/194790
PCT Pub. Date: Oct. 10, 2019

(65) Prior Publication Data
US 2021/0069705 A1  Mar. 11, 2021

(51) Int. Cl.
*B01L 3/00* (2006.01)
*G01N 15/02* (2006.01)

(52) U.S. Cl.
CPC .... *B01L 3/502715* (2013.01); *G01N 15/0266* (2013.01); *B01L 2300/0645* (2013.01);
(Continued)

(58) Field of Classification Search
CPC .. B01D 15/10; B01F 13/0059; B01F 13/0066; B01F 2215/0036;
(Continued)

(56) References Cited

U.S. PATENT DOCUMENTS 6,063,339 A    5/2000  Tisone et al.
9,149,806 B2  10/2015  Collins
(Continued)

FOREIGN PATENT DOCUMENTS

JP      2017531440 A      10/2017
WO  WO-2006122645 A1  11/2006
(Continued)

*Primary Examiner* — Jennifer Wecker
(74) *Attorney, Agent, or Firm* — Perry + Currier Inc (57) ABSTRACT

An example device includes a first microfluidic channel in communication with a fluid reservoir to receive cell-containing fluid from the fluid reservoir. The device further includes a second microfluidic channel in communication with the fluid reservoir to receive cell-containing fluid from the fluid reservoir. The device further includes a first sensor disposed at the first microfluidic channel, a second sensor disposed at the second microfluidic channel, a first dispense nozzle disposed at an end of the first microfluidic channel, and a second dispense nozzle disposed at an end of the second microfluidic channel. The first microfluidic channel is shaped to convey cells of a first size range, and the second microfluidic channel is shaped to convey cells of a second size range that is different from the first size range.

15 Claims, 8 Drawing Sheets

(52) U.S. Cl.
CPC ... *B01L 2300/0864* (2013.01); *B01L 2400/02* (2013.01); *B01L 2400/0439* (2013.01); *B01L 2400/0442* (2013.01)

(58) Field of Classification Search
CPC ............ B01F 2215/0037; B01F 5/0601; B01J 19/0093; B01J 2219/00889; B01J 2219/00894; B01J 2219/00896; B01J 2219/00898; B01L 2300/0816; B01L 2300/0864; B01L 2300/0867; B01L 2400/086; B01L 3/502707; B01L 3/502746; G01N 30/6017
See application file for complete search history.

(56) References Cited

U.S. PATENT DOCUMENTS

| | | | |
|---|---|---|---|
| 9,410,832 B2 | 8/2016 | Richter et al. | |
| 9,624,536 B2 | 4/2017 | Peumans | |
| 9,784,664 B2 | 10/2017 | Sadri et al. | |
| 2007/0053797 A1* | 3/2007 | Muraishi | B01L 3/021 422/400 |
| 2007/0120889 A1 | 5/2007 | Kang et al. | |
| 2015/0306597 A1 | 10/2015 | Ram | |
| 2016/0025761 A1 | 1/2016 | West | |
| 2017/0108455 A1 | 4/2017 | McGuinness | |
| 2018/0003611 A1 | 1/2018 | Sells | |
| 2018/0021777 A1* | 1/2018 | Giri | G01N 15/0266 422/73 |

FOREIGN PATENT DOCUMENTS

| | | |
|---|---|---|
| WO | WO2016182034 A1 | 11/2016 |
| WO | WO2017018977 A1 | 2/2017 |
| WO | WO-2017119904 A1 | 7/2017 |

* cited by examiner

MICROFLUIDIC CHANNELS TO CONVEY CELLS OF DIFFERENT SIZES

BACKGROUND

Fluid dispensing is often used for biological and biochemical processes such as cell assays. A droplet of cell-containing fluid may be dispensed into a well or vial, in which an assay or other process is to be performed. A tray may be moved to dispense droplets into an array of wells or vials, such that many processes may be performed in parallel.

DETAILED DESCRIPTION

The accuracy and reliability of dispensing cells in a fluid may depend on the structure of a microfluidic flow path that conveys the fluid from a source to a dispensing nozzle. The microfluidic flow path may not function well for a particular type of cell. Cells may therefore be unreliably dispensed or may collect within the path to form blockages. For example, dispensing a large type of cell with a microfluidic flow path that is undersized may lead to blockages and dispensing may be inhibited. When a microfluidic flow path is oversized, cells may be dispensed too freely and may be wasted, particularly in single-cell assays. An operator may attempt to predict the performance of a microfluidic channel for a particular cell-continuing fluid. However, this demands a high level of skill or experience from the operator and may require a large number of differently structured microfluidic devices for the operator to choose from.

A dispense device may include a plurality of microfluidic channels shaped to convey cells of different size ranges, so that dispensing of a particular cell-containing fluid may be characterized and a suitable microfluidic channel may be selected. A channel may end at a dispense nozzle, which may be used to jet a quantity of cell-containing fluid from the channel. A channel may be provided with a sensor, such as a pair of electrodes, located upstream of the dispense nozzle to sense cells contained within fluid flowing in the channel. The character of the signals obtained from sensors of different channels may be used to select a channel to dispense cells of a target size range. A pulse may be exhibited in a signal when a cell passes the sensor. Strength and reliability of pulses may indicate that a channel is suitable for dispensing. A long pulse may indicate that cells have become stuck in the channel and that the channel is not suitable for dispensing. As such, differently sized channels of a dispense device may be characterized with respect to a specific type of cell or a specific sample, with a suitable channel being selected for use. Operators need not attempt to predict performance and it may be possible to stock fewer dispense devices.

Figure 1:
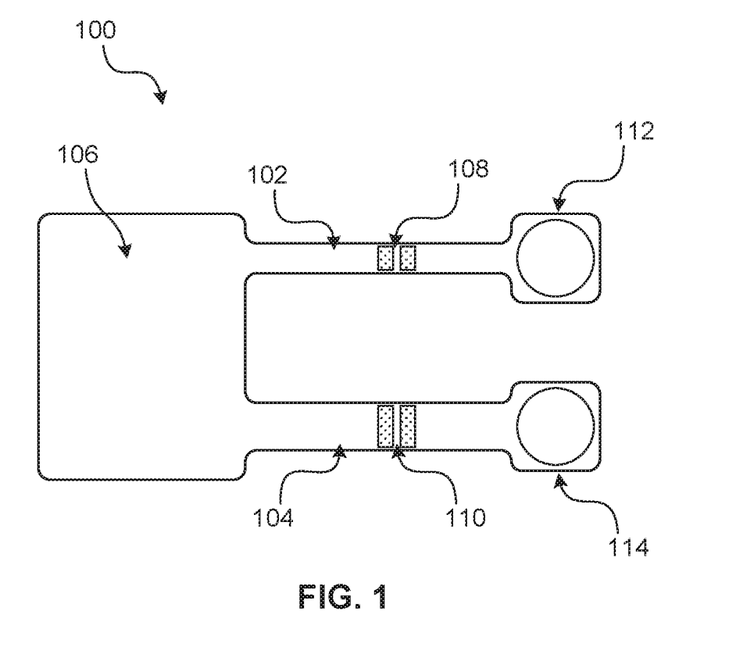
FIG. 1 is a plan view of an example device including microfluidic channels to convey cells of different size ranges.

FIG. 1 shows an example device 100. The device 100 may be referred to as a microfluidic device. The device 100 may be provided in a substrate, such as a silicon or glass substrate, and such a substrate may have multiple layers. The device 100 may be provided to a head of a thermal or piezoelectric droplet jetting device. Such a head may be referred to as a print head and such a device may employ inkjet droplet jetting techniques.

The device 100 includes a plurality of microfluidic channels, such as a first microfluidic channel 102 and a second microfluidic channel 104. The microfluidic channels 102, 104 are in communication with a fluid reservoir 106. The fluid reservoir 106 may be an end region of a slot in the substrate, and such a slot may convey fluid from a user-fillable reservoir, fill cup, cartridge, or similar volume to the microfluidic channels 102, 104. The microfluidic channels 102, 104 are to receive cell-containing fluid from the fluid reservoir 106. Any number of microfluidic channels may be provided, with two being an example for explanatory purposes. The terms "first" and "second" as used herein are for sake of identification only and carry no other connotation.

The fluid reservoir 106 may be provided with a fluid that contains biological or biochemical material, such as eukaryotic cells, prokaryotic cells, or similar. The device 100 may be used to dispense cells for various purposes, such as cell-based assays.

The device 100 includes a plurality of sensors, such as a first sensor 108 disposed at the first microfluidic channel 102 and a second sensor 110 disposed at the second microfluidic channel 104. Any number of sensors may be provided. In some examples, a sensor is provided to each microfluidic channel. A sensor 108, 110 may include an electrical sensor, an electromagnetic sensor, a chemical sensor, an optical sensor, or similar. A sensor 108, 110 may be passive or active.

A sensor 108, 110 may include a pair of electrodes, as depicted, that sense a voltage through material in the microfluidic channels 102, 104. When fluid in a microfluidic channel 102, 104 contains a cell in an effective range of the sensor 108, 110, the sensor 108, 110 may sense a voltage change. The change in voltage may be a voltage pulse, as the fluid moves the cell past the sensor 108, 110.

A microfluidic channel 102, 104 and its sensor 108, 110 may be sensitive to a cell characteristic, such as cell size. A large pulse measured by a sensor 108, 110 may indicate that the respective microfluidic channel 102, 104 is of size suitable for the cell that caused the pulse. A small pulse may indicate that the cell is too small for the respective microfluidic channel.

The device 100 further includes a plurality of dispense nozzles, such as a first dispense nozzle 112 disposed at an end of the first microfluidic channel 102 and a second dispense nozzle 114 disposed at an end of the second microfluidic channel 104. Any number of dispense nozzles may be provided. In some examples, a dispense nozzle is provided at the end of each microfluidic channel.

A dispense nozzle 112, 114 may draw fluid along the respective microfluidic channel 102, 104 and jet droplets of fluid from the respective microfluidic channel 102, 104. The dispense nozzle 112, 114 may create low pressure within the respective microfluidic channel 102, 104 to pull the fluid through the respective microfluidic channel 102, 104. The dispense nozzle 112, 114 may be controllable, in that the dispense nozzle 112, 114 may be turned on to jet droplets and draw fluid through the respective microfluidic channel 102, 104 and may be turned off to cease jetting droplets and therefore cease drawing fluid. A dispense nozzle 112, 114 may be a thermally driven nozzle, such as a thermal inkjet (TIJ) nozzle, a piezoelectric nozzle, or similar.

Droplets of fluid may be dispensed from the dispense nozzles 112, 114 to a target area, such as a substrate, an array of wells, vials, or similar. A droplet of fluid may contain a cell.

The first microfluidic channel 102 is shaped to convey cells of a first size range and the second microfluidic channel 104 is shaped to convey cells of a second size range. The second size range is different from the first size range. In the example illustrated, the first microfluidic channel 102 has a smaller width than the second microfluidic channel 104 and, as such, the second microfluidic channel 104 can accommodate cells of a larger size than those that can fit through the first microfluidic channel 102. The cell-size selectiveness of the microfluidic channels 102, 104 may be implemented in other ways, such as by varying channel height, varying channel cross-sectional area, varying channel curvature, adding obstructions or filters, and the like. The different shapes of the microfluidic channels 102, 104 may consider that cells are three-dimensional structures that may be asymmetric.

Shape as discussed herein with respect to a microfluidic channel may refer to a cross-sectional shape, a cross-sectional dimension, a path that defines a direction of flow through the channel, or similar. For example, microfluidic channels having rectangular cross sections of different size may be considered to have different shape.

Shaping a microfluidic channel 102, 104 to accommodate a cell size range may be used to discriminate among cells contained in a fluid sample. For example, the general shape and size of a sperm cell (average volume of 30 $\mu m^3$), red blood cell (100 $\mu m^3$), lymphocyte (130 $\mu m^3$), neutrophil (300 $\mu m^3$), beta cell (1000 $\mu m^3$), fat cell (600,000 $\mu m^3$), and other cells may be referenced to shape the microfluidic channels 102, 104 to accommodate a size range of a target cell type. Overlapping size ranges for the same target cell type may be accommodated by differently shaped microfluidic channels 102, 104. Microfluidic channels 102, 104 with differing or overlapping size ranges may allow for increased dispensing accuracy and may allow for details of the interaction between a target cell type in a particular fluid sample and the microfluidic structures to be neglected. A plurality of candidate microfluidic channels 102, 104 may be provided and a microfluidic channel that yields the more accurate performance with the actual sample may be selected.

In operation, the dispense nozzles 112, 114 may be controlled to jet droplets of fluid containing cells of size ranges selected by the supplying microfluidic channel 102, 104. The sensors 108, 110 may output signals that may be used to characterize the flow through the microfluidic channels 102, 104. For example, size of cell and quality of flow may be characterized by signals from the sensors 108, 110. Pulse size may indicate cell size relative to dimensions of a microfluidic channel. A pulse of long duration may indicate obstruction of flow, as shown at 502 in FIG. 5. Other information may also be discernable. Based on the characterized flow, a particular dispense nozzle 112, 114 may be selected as an active cell dispense nozzle to dispense cell-containing fluid droplets, and the remaining dispense nozzles may be deactivated to cease dispensing fluid.

In an illustrative example, it may be desirable to dispense red blood cells using the device 100. Red blood cells may be considered to have an average volume of about 100 $\mu m^3$ with generally understood dimensions and shape. However, these properties may vary from sample to sample and may be affected by various pathological conditions, disease, etc. For example, low hemoglobin may cause red blood cells to flatten. As such, a general size and shape may be expected, yet the interaction of a specific sample of red blood cells with specific microfluidic flow paths, such as the channels 102, 104, may be subject to significant uncertainty. In addition, a fluid sample containing target red blood cells may be heterogenous and may contain other biological material, such as other types of cells of other shapes and sizes. Accordingly, a plurality of microfluidic channels 102, 104 having different shapes to accommodate different size ranges of red blood cells may be provided. All dispense nozzles 112, 114 may be activated to urge sample fluid to flow within all of the microfluidic channels 102, 104. Signals from the sensors 108, 110 may then be used to characterize the flow. It may be detected that a particular microfluidic channel 102, 104 is blocked or has poor reliability in conveying red blood cells, while another microfluidic channel 102, 104 may provide sufficiently reliable conveyance. As such, the reliable microfluidic channel 102, 104 may be selected as the active channel to dispense red blood cells into an array of wells for performance of an assay or other process. The other microfluidic channels 102, 104 may be deactivated to stop flow and dispensing of cells.

Figure 2:
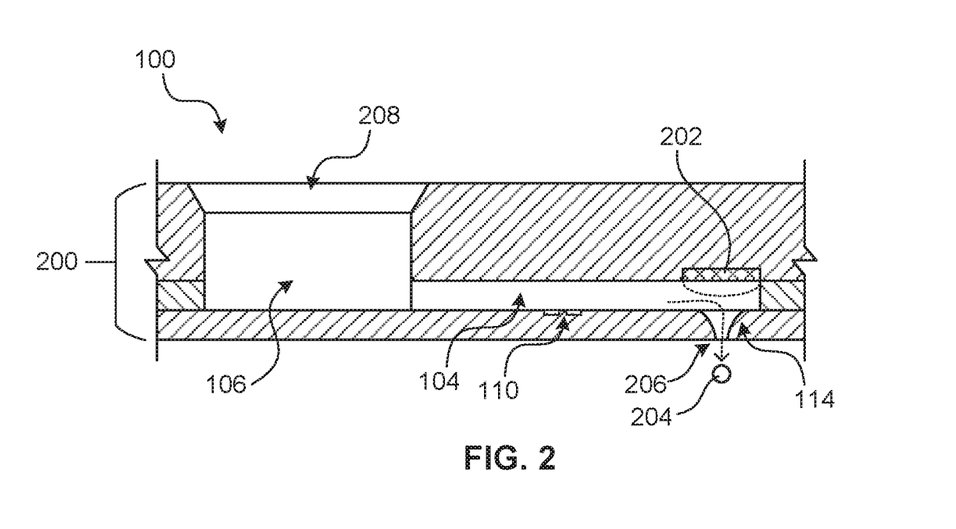
FIG. 2 is a cross-sectional view of an example device with microfluidic channels to convey cells of different sizes and a flow-characterizing sensor located upstream of a dispense nozzle.

FIG. 2 shows an example device 100 viewed in section from the side.

The device 100 may include a plurality of substrate layers 200 to provide the fluid reservoir 106, microfluidic channels 104, and other structure.

A dispense nozzle 114 may include a jet element 202, such as a resistive heater, a piezoelectric element, or similar. The jet element 202 is controllable to draw fluid through the channel 104 and jet fluid droplets 204 through an orifice 206.

The fluid reservoir 106 may include an inlet region 208 to convey fluid from a fluid source, such as a fill cup that allows manual filling of fluid into the fluid reservoir 106.

Figure 3:
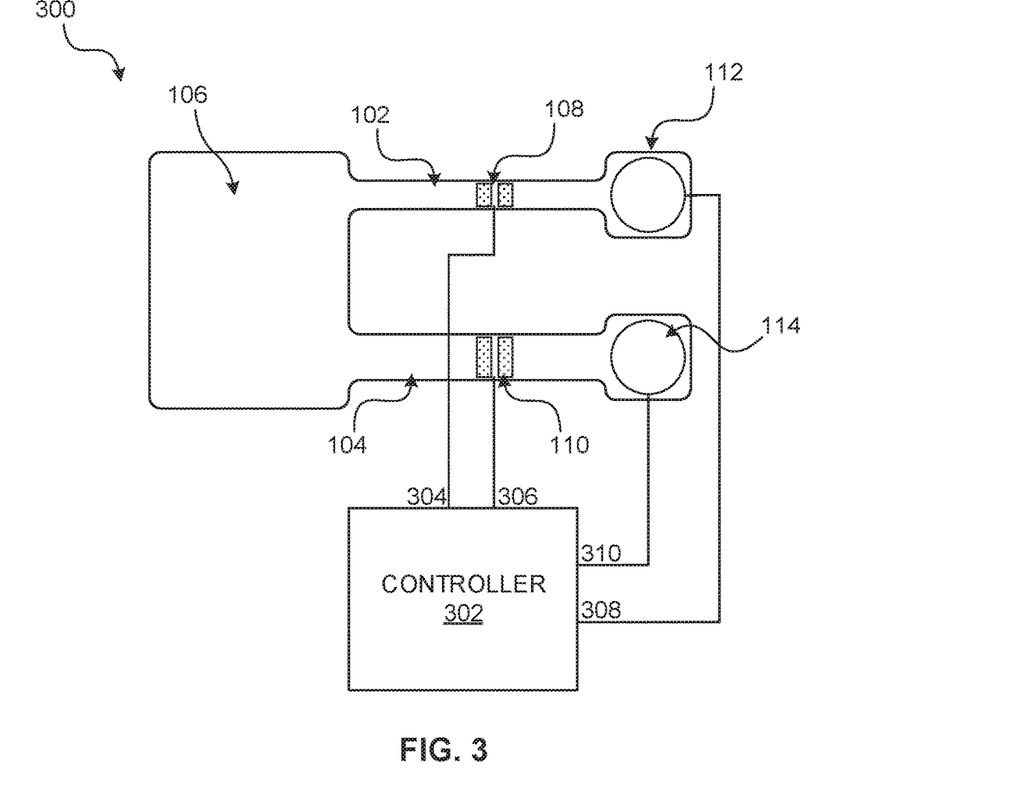
FIG. 3 is a plan view of an example device including microfluidic channels to convey cells of different size ranges and an example controller.

FIG. 3 shows an example device 300 that includes a controller 302. Features and aspects of the other devices described herein may be used with the device 300 and vice versa. Like reference numerals denote like elements and description of like elements is not repeated here.

The controller 302 is connected to sensors 108, 110 and dispense nozzles 112, 114 provided to microfluidic channels 102, 104. The controller 302 may control the dispense nozzles 112, 114 based on signals obtained from the sensors 108, 110.

The controller 302 may be separate from the sensors 108, 110 and the dispense nozzles 112, 114. Electrical connections between the controller 302 and the sensors 108, 110 and dispense nozzles 112, 114 may be removably connectable. For example, the controller 302 may be included in a dispenser device and the microfluidic components, such as the channels 102, 104, sensors 108, 110, and dispense nozzles 112, 114, may be provided in a removable cassette.

In other examples, the controller 302 may be integrated into a microfluidic device that includes microfluidic components, such as the channels 102, 104, sensors 108, 110, and dispense nozzles 112, 114. The controller 302 may be provided to a substrate that carries the microfluidic components.

The controller 302 may include a microcontroller, a microprocessor, a processing core, a field-programmable gate array (FPGA), a central processing unit (CPU), a graphics processing unit (GPU), or similar device capable of executing instructions. The controller 302 may cooperate with a memory to execute instructions. The memory may include a non-transitory machine-readable storage medium that may be an electronic, magnetic, optical, or other physical storage device that stores executable instructions. The machine-readable storage medium may include, for example, random access memory (RAM), read-only memory (ROM), electrically-erasable programmable read-only memory (EEPROM), flash memory, a storage drive, an optical disc, and the like. The machine-readable storage medium may be encoded with executable instructions.

The controller 302 may output a first drive signal 308 and a second drive signal 310 to respectively drive the first and second dispense nozzles 112, 114 to dispense cells from the respective microfluidic channels 102, 104. The controller 302 may obtain a first signal 304 from the first sensor 108 and a second signal 306 from the second sensor 110. The controller 302 may then reference the first and second signals 304, 306 to select the first dispense nozzle 112 or the second dispense nozzle 114 as an active cell dispense nozzle. The controller 302 may then output the first drive signal 308 or the second drive signal 310 to drive the active cell dispense nozzle to dispense cells from the respective microfluidic channel 102, 104. The controller 302 may cease output of drive signals for non-selected nozzles. For example, if the sensor signals 304, 306 indicate that the first microfluidic channel 102 provides a desired dispensing characteristic, then the controller 302 outputs the drive signal 308 and does not output the drive signal 310. Conversely, if the sensor signals 304, 306 indicate that the second microfluidic channel 104 provides a desired dispensing characteristic, then the controller 302 outputs the drive signal 310 and does not output the drive signal 308.

The controller 302 may compare the signals 304, 306 to each other and select the dispense nozzle 112, 114 that corresponds to the signal 304, 306 that exhibits a cell dispense characteristic, such as a more stable series of pulses, fewer indications of channel obstruction, or similar. The controller 302 may compare the signals 304, 306 to a reference signal that describes a target cell dispense characteristic and select the dispense nozzle 112, 114 that corresponds to the signal 304, 306 that better matches the reference signal.

Using the sensor signals 304, 306 to characterize flow of cell-containing fluid and to select a dispense nozzle 112, 114 may be performed by the controller 302 when the device 300 is initially put into operation. A calibration or characterization process may be performed prior to production operation, during which the selected dispense nozzle 112, 114 is used to dispense cell-containing fluid for a cellular-assay or other biological or biochemical application.

For applications that use a well plate or similar array of target locations, the controller 302 may control a position of the active cell dispense nozzle with respect to the different target locations. That is, the controller 302 may control the active cell dispense nozzle to move relative to a stationary target-location structure (e.g., a well plate) or may control the target-location structure to move relative to a stationary active cell dispense nozzle. The controller 302 may dispense any number of cells at a target location before moving to a next target location.

Figure 4:
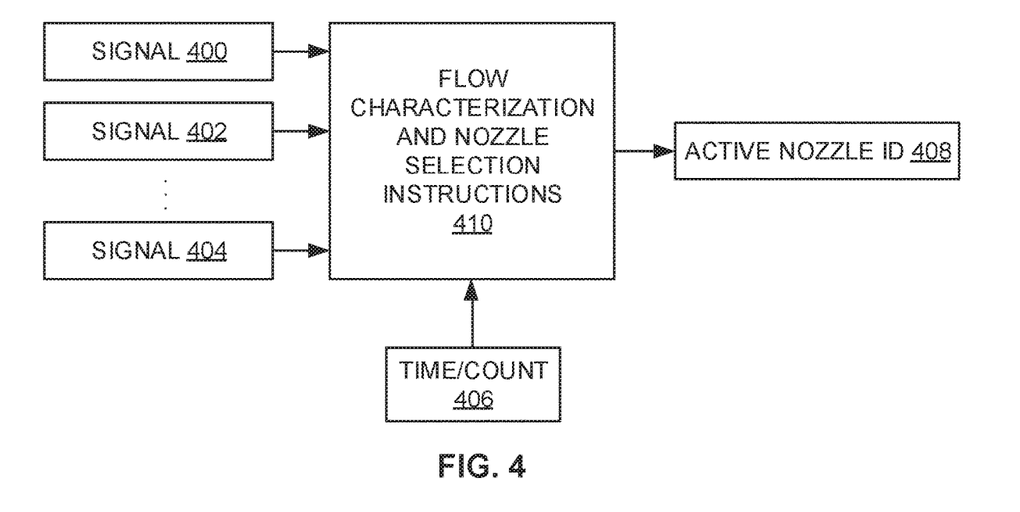
FIG. 4 is a schematic diagram of example instructions and data that may be processed by an example controller to select an active dispense nozzle of a plurality of microfluidic channels to convey cells of different sizes.

FIG. 4 shows a schematic diagram of example instructions and data that may be processed by a controller to select an active dispense nozzle from a plurality of dispense nozzles based on a sensed flow characteristic of a plurality of microfluidic channels that feed the dispense nozzles.

Input data includes signals 400, 402, 404 obtained from sensors at the microfluidic channels that feed the dispense nozzles.

Input data may further include a time or count 406, so that selection of an active nozzle may be time constrained. Examples of time constraints include selecting an active nozzle prior to production operation of the microfluidic device, periodically selecting an active nozzle during production operation, and similar. The time or count 406 may be used to determine a time window during which the active nozzle is selected. During such a time window, output of all dispense nozzles may be discarded.

Output data includes a logical identifier of the selected active nozzle 408. An active nozzle identifier 408 may be used as an input to demultiplexer or other type of switch that selectably provides a drive signal to the dispense nozzles.

Figure 5:
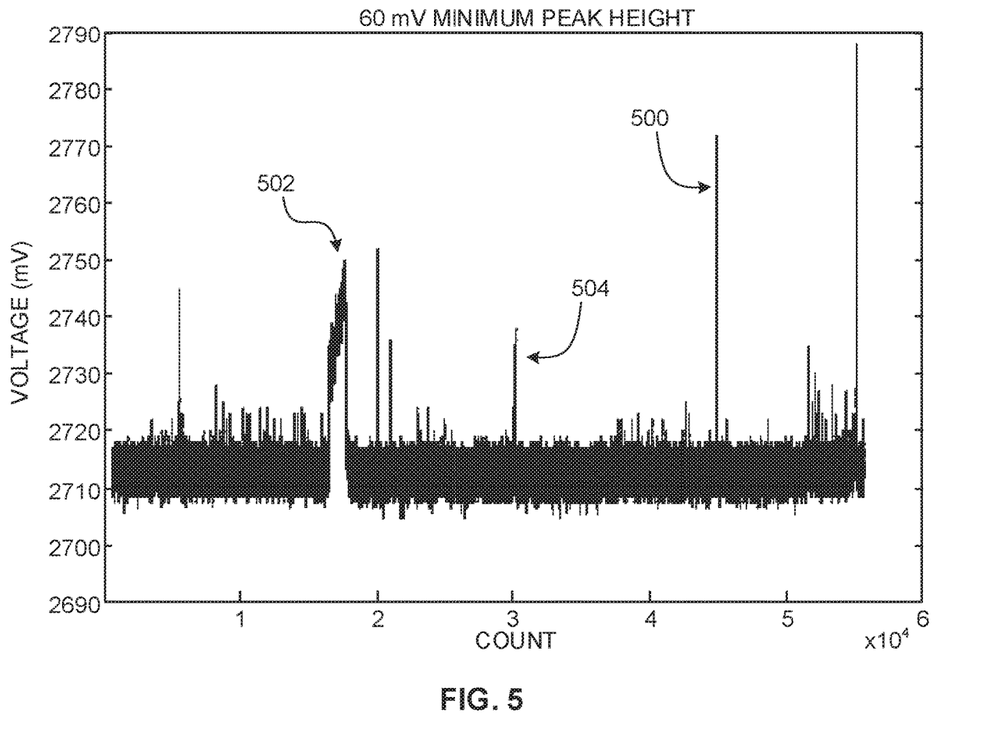
FIG. 5 is a graph of an example signal of an example sensor registering example cell flow within microfluidic channels to convey cells of different sizes.

Flow characterization and nozzle selection instructions 410 take the input data and generate an active nozzle identifier 408 as output data. The instructions 410 may associate signal characteristic with flow characteristic. For example, as shown in FIG. 5, flow of a cell past a sensor may register as a pulse 500. Pulse size may correlate to cell size relative to channel shape. A cell that obstructs a channel may cause a longer duration signal 502.

In addition, FIG. 5 shows a pulse 504 representative of a cell that is too small for the particular channel. The flow characterization and nozzle selection instructions 410 may use amplitude discrimination to distinguish cell size relative to channel shape and further may reference time or count 406 to identify obstructions.

Figure 6:
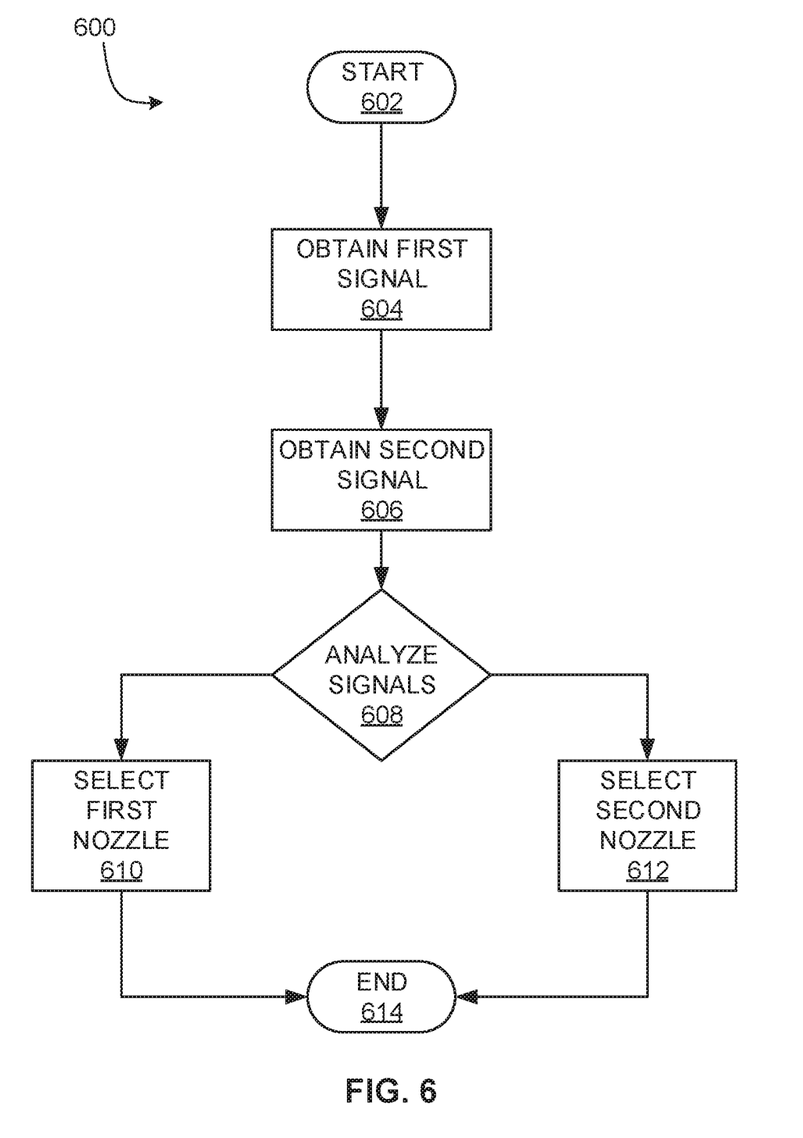
FIG. 6 is a flowchart of an example method of selecting a dispense nozzle based on microfluidic channel flow to convey cells of different sizes.

FIG. 6 shows an example method 600 of selecting a dispense nozzle based on channel flow. The method 600 may be performed by any of the devices discussed herein. The method 600 may be embodied by a controller or instructions thereof. The method begins at block 602.

At block 604, a first signal is obtained from a first sensor at a first microfluidic channel that is in communication with a reservoir of cell-containing fluid, while a first dispense nozzle is driven. The first sensor may include an electrode and the first signal may be a voltage signal over time.

At block 606, a second signal is obtained from a second sensor at a second microfluidic channel that is in communication with the reservoir, while a second dispense nozzle is driven. The second sensor may include an electrode and the second signal may be a voltage signal over time.

At block 608, the first and second signals are analyzed. Signal characteristics, such as shown in FIG. 5, may be determined. The first and second signals may be compared to each other or compared to a reference signal to determine whether to select the first dispense nozzle, at block 610, or to select the second dispense nozzle, at block 612, as the active cell dispense nozzle. Block 608 may characterize an interaction of the cell-containing fluid with each channel and its respective nozzle to select the active cell dispense nozzle.

The method 600 ends at block 614. Nozzles that are not selected may be stopped.

Figure 7:
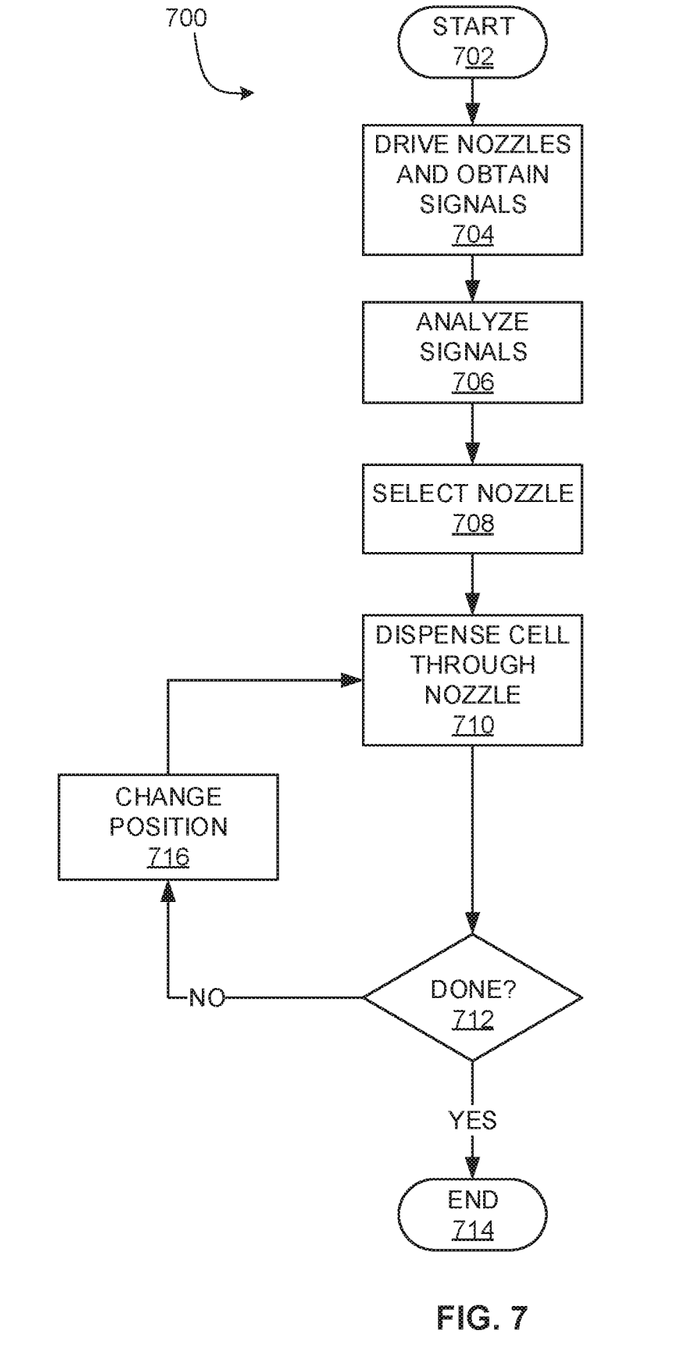
FIG. 7 is a flowchart of an example method of using a selected dispense nozzle of a plurality of microfluidic channels to dispense cells of different sizes at target locations.

FIG. 7 shows an example method 700 of using a selected dispense nozzle to dispense cells at target locations. The method 700 may be performed by any of the devices discussed herein. The method 700 may be embodied by a controller or instructions thereof. The method begins at block 702.

At block 704, a plurality of selectable dispense nozzles is driven, and a plurality of signals is obtained from a plurality of sensors at a plurality of microfluidic channels extending between a reservoir of cell-containing fluid and the plurality of selectable dispense nozzles. The selectable dispense nozzles may be provided to a common dispense head that has a controllable position relative to a well plate or other structure that provides a plurality of target locations.

At block 706, the obtained signals are analyzed, as described elsewhere herein, and then an active dispense nozzle is selected from the plurality of dispense nozzles, at block 708. Block 706 may characterize an interaction of the cell-containing fluid with each channel and its respective nozzle to select the active cell dispense nozzle, at block 708.

At block 710, the active cell dispense nozzle is driven to dispense a portion of cell-containing fluid to a target location. Other dispense nozzles may be stopped. Any number of cells may be dispensed to the target location and the respective sensor signal may be used to confirm that a cell is contained within a portion of fluid to be dispensed.

After a selected number of dispensations, at block 712, the method 700 ends at block 714.

After a dispensation, a position of the active cell dispense nozzle with respect to a set of different target locations, such as at a well plate or other structure, may be changed at block 716. A sensor signal that corresponds to the active cell dispense nozzle, i.e., that is in the same microfluidic channel, may be referenced to dispense a cell at each of the different target locations.

Figure 8:
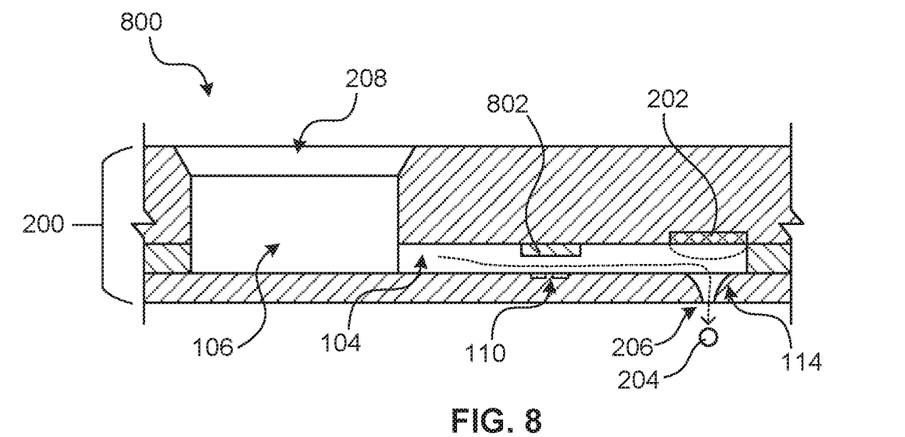
FIG. 8 is a cross-sectional view of an example device including a structure to guide cells into proximity of a flow-characterizing sensor within a microfluidic channel to convey cells of different sizes.

FIG. 8 shows an example device 800 viewed in section from the side. Features and aspects of the other devices described herein may be used with the device 800 and vice versa. Like reference numerals denote like elements and description of like elements is not repeated here.

The device 800 includes a surface feature 802 that extends into a microfluidic channel 104 to guide cells into sensing proximity of a flow-characterizing sensor 110 located upstream of a dispense nozzle 114. The surface feature 802 may include a protrusion into the microfluidic channel 104, a localized narrowing of the microfluidic channel 104, or similar. The surface feature 802 urges cells within the fluid flowing past the sensor 110 into vicinity of the sensor 110, so that the characteristic, such as size, of the cells may be accurately sensed.

Figure 9:
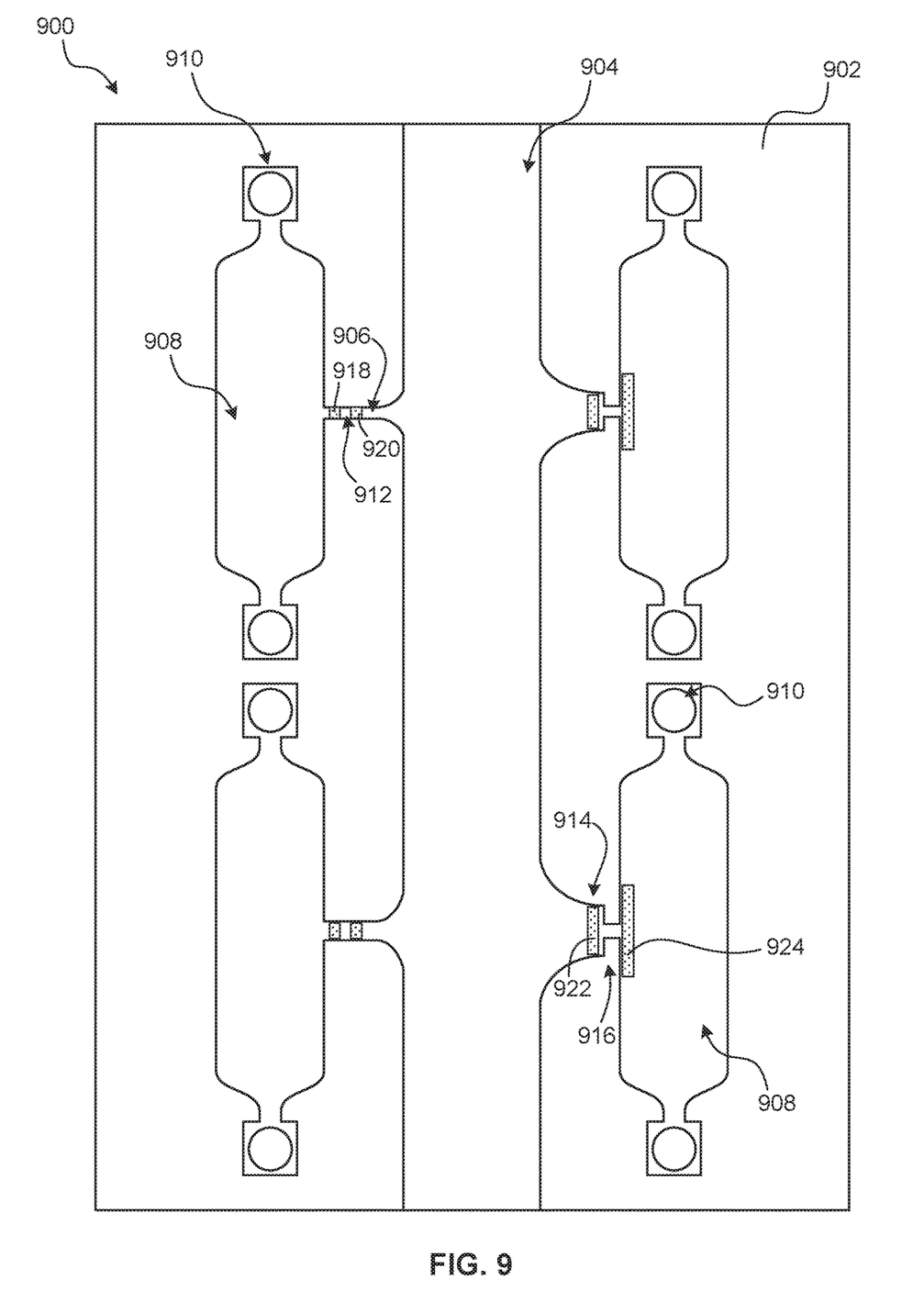
FIG. 9 is a plan view of another example device including microfluidic channels to convey cells of different size ranges.

FIG. 9 shows an example device 900. Features and aspects of the other devices described herein may be used with the device 900 and vice versa. Like reference numerals denote like elements and description of like elements is not repeated here.

The device 900 includes a substrate 902 that defines a fluid reservoir 904 and a plurality of downstream channels 906, 914 in communication with the fluid reservoir 904. Each downstream channel 906, 914 may connect to a nozzle channel 908 that ends at a dispense nozzle 910. Cell-containing fluid may be provided to the fluid reservoir 904. Operation of a dispense nozzle 910 may draw fluid through the respective downstream channel 906, 914 and into the nozzle channel 908 to be dispensed at the dispense nozzle 910.

Downstream channels 906, 914 may have different shapes to accommodate different ranges of nominal cell size. For example, the downstream channel 906 may gradually narrow to a constant cross section. In another example, the downstream channel 914 may gradually narrow and then step down to a constant cross section.

A downstream channel 906, 914 may be provided with a sensor 912, 916 to sense cells contained in the fluid present in the channel 906, 914. Signals obtained from sensors 912, 916 may be used to characterize the flow of the cell-containing fluid through downstream channels 906, 914 and accordingly select a dispense nozzle 910 as an active dispense nozzle to dispense cells. Various sensor arrangements may be used. For example, a sensor 912 may include two electrodes 918, 920 in the downstream channel 906. In another example, a sensor 916 may include an electrode 922 in the downstream channel 914 and another electrode 924 in the nozzle channel 908.

Figure 10:
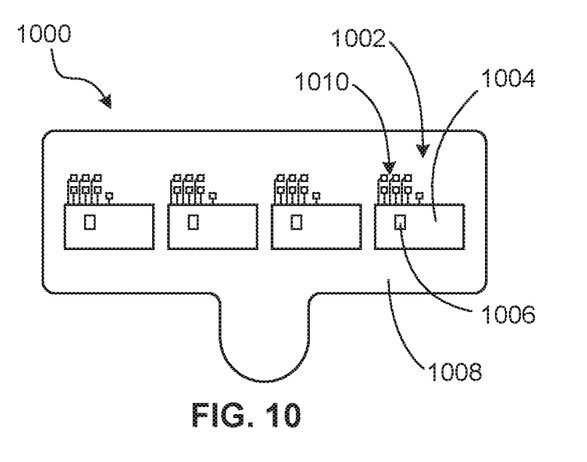
FIG. 10 is a top plan view of an example dispense head cassette including a dispense head including microfluidic channels to convey cells of different size ranges.

FIG. 10 shows an example device 1000. Features and aspects of the other devices described herein may be used with the device 1000 and vice versa. Like reference numerals denote like elements and description of like elements is not repeated here.

The device 1000 may be a cassette that carries a dispense head 1002. A dispense head 1002 may include a fill cup 1004 to receive cell-containing fluid. The fill cup 1004 may be open and manually fillable. The fill cup 1004 may include a fluid opening 1006 to convey cell-containing fluid to a substrate that carries a reservoir (e.g., reservoir 106 of FIG. 1), a plurality of microfluidic channels, a plurality of sensors, and a plurality of dispense nozzles, as described elsewhere herein.

The device 1000 may include a cassette frame 1008 that secures the dispense head 1002 and the microfluidic substrate thereof. The cassette frame 1008 may be removably connectable to a dispenser device, such as that shown in FIG. 12. The device 1000 may include a set of electrical contacts 1010 to electrically connect a sensor and dispense nozzle of the dispense head 1002 to the dispenser device.

Any number of dispense heads 1002 may be carried by the same cassette frame 1008. Each dispense head 1002 may be provided with a different fluid sample.

Figure 11:
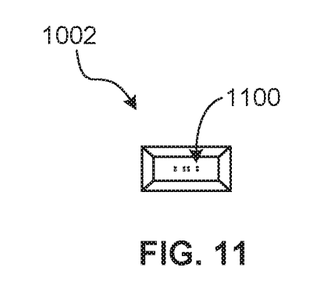
FIG. 11 is bottom plan view of an example dispense head of FIG. 10 to convey cells of different sizes within microfluidic channels.

FIG. 11 shows a dispense head 1002 as viewed from the opposite side as shown in FIG. 10. The dispense head 1002 may include an exposed substrate 1100 having a plurality of dispense nozzle orifices (e.g., orifice 206 of FIG. 2).

Figure 12:
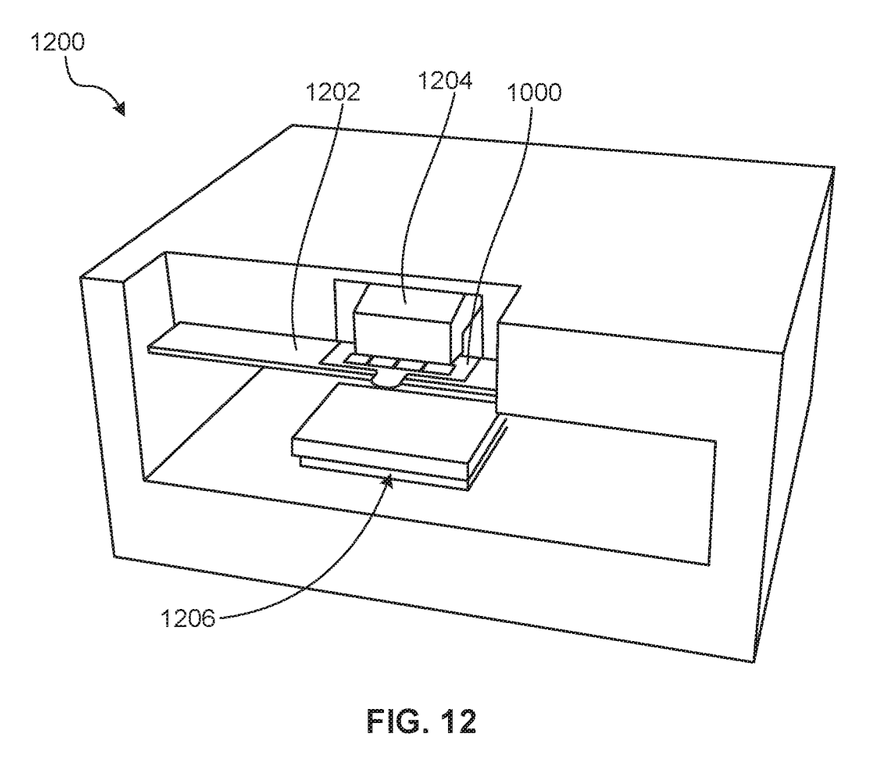
FIG. 12 is a perspective view of an example dispenser device to receive the dispense head cassette of FIG. 10 to convey cells of different sizes within microfluidic channels.

FIG. 12 shows an example device 1200. Features and aspects of the other devices described herein may be used with the device 1200 and vice versa. Like reference numerals denote like elements and description of like elements is not repeated here.

The device 1200 may be a dispenser device that may include a controller as described elsewhere herein. The device 1200 may further include a cassette holder 1202 to receive and secure a removable cassette 1000 that carries a dispense head. The device 1200 may further include an electrical connector 1204 that may include electrical contacts to connect to electrical contacts 1010 of the cassette 1000. The device 1200 may further include a tray 1206 to carry a well plate or similar structure of target locations. The device 1200 may control the position of the tray 1206 relative to a dispense head carried by the cassette 1000 to dispense cells at different locations.

In view of the above, it should be apparent that interactions between a sample of cell-containing fluid and different microfluidic channels may be characterized in order to select a microfluidic channel for production use. The need to predict the performance of a microfluidic channel for a particular fluid may be reduced or eliminated. The need to maintain a large number of different microfluidic devices may be reduced or eliminated.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A device comprising:
    a first microfluidic channel, the first microfluidic channel in communication with a fluid reservoir to receive cell-containing fluid from the fluid reservoir, the first microfluidic channel being shaped to convey cells of a first size range;
    a second microfluidic channel, the second microfluidic channel in communication with the fluid reservoir to receive cell-containing fluid from the fluid reservoir, the second microfluidic channel being shaped to convey cells of a second size range that is different from the first size range;
    a first sensor disposed at the first microfluidic channel;
    a second sensor disposed at the second microfluidic channel;
    a first dispense nozzle disposed at an end of the first microfluidic channel;
    a second dispense nozzle disposed at an end of the second microfluidic channel; and
    a controller configured to connect to the first sensor at the first microfluidic channel, the controller further to connect to the second sensor at the second microfluidic channel;
    the controller further configured to drive the first dispense nozzle at the first microfluidic channel to dispense cells from the first microfluidic channel, the controller further configured to drive the second dispense nozzle at the second microfluidic channel to dispense cells from the second microfluidic channel;
    the controller configured to obtain a first signal from the first sensor and to obtain a second signal from the second sensor, the controller further configured to make a determination of which of the first signal and the second signal is closer to a desired dispense characteristic of the cells and to select the first dispense nozzle or the second dispense nozzle as an active cell dispense nozzle based on the first signal and the second signal determination.

2. The device of claim 1, further comprising a surface feature to extend into the second microfluidic channel to guide cells into sensing proximity of the second sensor.

3. The device of claim 1, further comprising:
    a substrate to carry the first microfluidic channel, the first sensor, the first dispense nozzle, the second microfluidic channel, the second sensor, and the second dispense nozzle; and
    a cassette frame that secures the substrate, the cassette frame removably connectable to a dispenser device.

4. The device of claim 1, wherein the first dispense nozzle and the second dispense nozzle are thermally driven nozzles.

5. A device comprising:
    a controller configured to connect to a first sensor at a first microfluidic channel shaped to convey cells of a first size range, the controller further configured to connect to a second sensor at a second microfluidic channel shaped to convey cells of a second size range that is different from the first size range;
    the controller further configured to drive a first dispense nozzle at the first microfluidic channel to dispense cells from the first microfluidic channel, the controller further to drive a second dispense nozzle at the second microfluidic channel to dispense cells from the second microfluidic channel;
    the controller to obtain a first signal from the first sensor and to obtain a second signal from the second sensor, the controller further to make a determination of which of the first signal and the second signal is closer to a desired dispense characteristic of the cells and to select the first dispense nozzle or the second dispense nozzle as an active cell dispense nozzle based on the first signal and the second signal determination.

6. The device of claim 5, wherein the controller is further to drive the active cell dispense nozzle to dispense cells contained within a cell-containing fluid in the first microfluidic channel and the second microfluidic channel.

7. The device of claim 5, wherein the controller is to control a position of the active cell dispense nozzle with respect to different target locations, and wherein the controller is to reference a sensor signal corresponding to the active cell dispense nozzle to dispense a cell at each of the different target locations.

8. The device of claim 5, wherein the controller is to compare the first signal to the second signal to select the active cell dispense nozzle.

9. The device of claim 5, wherein the controller is to compare the first signal and the second signal to a reference signal to select the active cell dispense nozzle.

10. The device of claim 5, further comprising a cassette holder to receive a removable cassette that includes the first microfluidic channel, the first sensor, the first dispense nozzle, the second microfluidic channel, the second sensor, and the second dispense nozzle.

11. A device comprising a controller to electrically connect to a dispense head that includes a plurality of microfluidic channels, the plurality of microfluidic channels having different cell-size selectiveness, the controller configured to select an active dispense nozzle of the plurality of microfluidic channels based on a sensed characteristic of flow of cell-containing fluid determined from a first or second sensor positioned in one of the plurality of microfluidic channels, the controller configured to dispense cell-containing fluid from the active dispense nozzle.

12. The device of claim 11, wherein the controller is further to cease dispensing of cell-containing fluid from another dispense nozzle of the plurality of microfluidic channels.

13. The device of claim 11, wherein the controller is further to reference a flow-characterizing sensor located upstream of a dispense nozzle of the plurality of microfluidic channels to determine the sensed characteristic of flow of cell-containing fluid in the plurality of microfluidic channels.

14. The device of claim 11, further comprising a cassette holder to receive a removable cassette that includes the dispense head.

15. The device of claim 11, wherein the controller is to electrically connect to a plurality of dispense heads including the dispense head.

* * * * *